J. AND M. R. BALENTI.
PANCAKE MACHINE.
APPLICATION FILED OCT. 23, 1919.
1,363,706.
Patented Dec. 28, 1920.
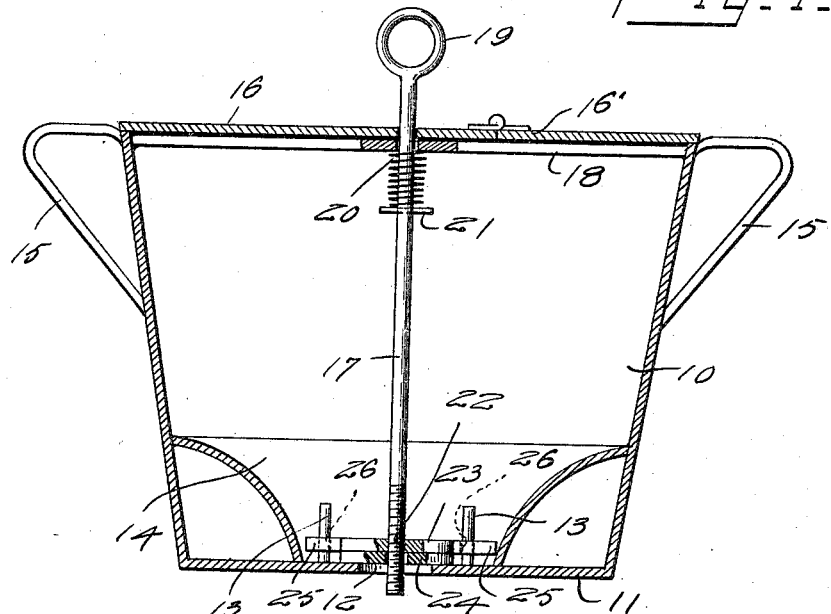
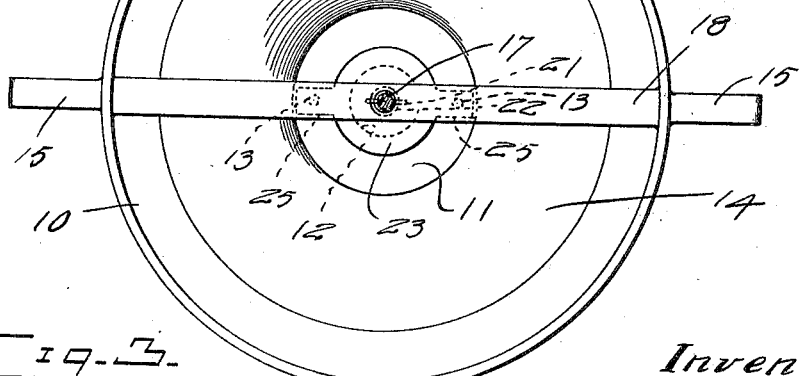
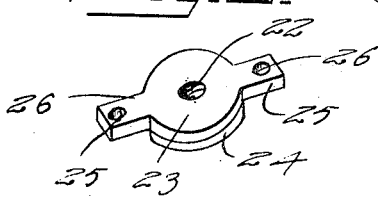
Inventor
J. Balenti
M. R. Balenti

UNITED STATES PATENT OFFICE.

JOHN BALENTI AND MICHAEL R. BALENTI, OF CALUMET, OKLAHOMA.

PANCAKE-MACHINE.

1,363,706.

Specification of Letters Patent.

Patented Dec. 28, 1920.

Application filed October 23, 1919. Serial No. 332,611.

*To all whom it may concern:*

Be it known that we, JOHN BALENTI and MICHAEL R. BALENTI, citizens of the United States, residing at Calumet, in the county of Canadian and State of Oklahoma, have invented certain new and useful Improvements in Pancake-Machines; and we do hereby declare the following to be a full, clear, and exact description of the invention, such as will enable others skilled in the art to which it appertains to make and use the same.

This invention relates to an improved pancake machine and the principal object of the invention is to provide a machine in which pancake dough may be mixed and held while being used, improved valve means and actuating means for the valves being provided for controlling passage of the pancake dough out of the outlet opening in the bottom of the receptacle or container.

Another object of the invention is to so construct this container that all of the dough will be fed out of the container, the lower portion of the container being so constructed that the dough will be directed toward the outlet opening.

Another object of the invention is to provide an improved type of valve and mounting for the valve, the stem of the valve being adjustable with respect to the valve for controlling the amount of dough passing out of the outlet opening when the valve is opened and closed.

Another object of the invention is to so construct this valve that adjustment thereof may be made through the medium of the valve stem without it being necessary to open the receptacle or remove the valve from the receptacle.

This invention is illustrated in the accompanying drawings, wherein:

Figure 1 is a vertical sectional view through the improved pancake machine.

Fig. 2 is a top plan view of the improved pancake machine.

Fig. 3 is a perspective view of the valve used in connection with the pancake machine.

This pancake machine is provided with a body or receptacle 10 which is in the form of a bucket and is provided with a bottom 11 having a centrally located outlet opening 12 upon opposite sides of which there has been provided upstanding pins 13, the purpose of which will be hereinafter brought out. A false bottom or diaphragm 14 is positioned in the receptacle 10 and converges toward the outlet opening 12 thus causing the dough in the receptacle to be guided or directed toward the outlet opening and thus preventing the dough from accumulating in the lower portion of the receptacle and failing to pass out through the outlet opening when the valve is open. Handles 15 are provided for easy handling of the receptacle and in order to cover the receptacle and prevent dust and other foreign substances from dropping into the receptacle, there has been provided a cover 16 which may be provided with a section 16' hingedly mounted thus permitting of easy access to the interior of the receptacle.

A valve stem 17 extends through the cover and through a cross bar 18 mounted in the upper portion of the receptacle and is provided at its upper end with a handle 19 by means of which the valve stem may be easily raised against the action of the spring 20 positioned about the stem between the cross bar 18 and abutment or cotter pin 21 and serving to yieldably retain the valve stem in a lowered position. This valve stem has a threaded lower end portion which passes through the threaded opening 22 of the disk valve 23 and also passes through an opening formed in the rubber gasket 24 positioned beneath the disk valve 23 and engaging the bottom of the receptacle to provide a tight closure for the outlet opening 12 and prevent leakage of dough through this opening when the valve is in the closed position. This disk valve 23 is provided with side arms 25 having openings 26 formed therein through which the pins 13 will pass to guide the sliding movement of this valve and further prevent the valve from rotating with the valve stem when the valve stem is turned to make adjustments as will be hereinafter brought out.

When in use, the materials for forming the pancake dough are placed in the receptacle and stirred until the pancake dough is formed of the proper consistency. The receptacle will then be placed at a convenient point where it can be reached by the person cooking the pancakes. When dropping the dough upon the griddle, the handle 19 will be grasped and the valve stem 17 drawn upwardly until upward movement is stopped by the spring 20 being compressed as far as possible. The handle will then be released and the spring will return the valve into the closed position. While the valve is being moved upwardly and then returned to the closed position, the dough will flow out through the outlet opening 12 and drop upon the griddle. If it is found that too much dough is passing through the opening 12 with one lifting and closing of the valve or not enough dough to fry a pancake of the desired size, the valve stem will be rotated in the lowered position and this will cause the stem to move upwardly or downwardly through the disk valve and rubber gasket. Therefore, the position of the disk valve upon the stem will be changed and further the cotter key will be moved closer to or farther away from the cross bar 18 thereby causing the amount of vertical movement of the stem 17 to be changed. Therefore, the upward movement of the stem will be increased or decreased and the valve caused to return to the seat in a shorter or greater length of time and thereby causing the amount of dough passing through the outlet opening 12 to be varied. If it is desired to take this pancake machine apart for thorough cleaning, this can be easily done by removing the cotter key 21 and rotating the valve stem until out of engagement with the disk valve. The stem can then be withdrawn from the cross bar 18 and the cover removed. After the cover and stem have been removed, the disk valve and washer can be removed and the machine then thoroughly cleaned and reassembled.

There has therefore been provided a pancake machine which is comparatively simple in construction and very efficient in operation.

What is claimed is:

1. A pancake machine comprising a receptacle having a bottom provided with a centrally located opening, a false bottom in the receptacle for directing material in the receptacle toward the opening in the bottom thereof, a cross bar in the upper portion of the receptacle and provided with an opening positioned above the opening in the bottom of the receptacle, a valve stem slidably mounted in the opening of the cross bar and extending through the opening in the bottom of the receptacle, a disk valve screwed upon the lower end portion of the valve stem, a resilient gasket positioned beneath the disk valve and provided with an opening through which the threaded lower portion of the stem passes, arms extending from the disk valve, pins extending from the bottom of the receptacle through openings formed in the arms to guide sliding movement of the disk valve and hold the same against rotary movement with the stem, an abutment carried by the valve stem, and resilient means positioned between the abutment and cross bar for yieldably retaining the valve stem in a lowered position with the valve and gasket closing the opening in the bottom thereof.

2. A pancake machine comprising a receptacle having a bottom provided with an outlet opening, pins extending from the bottom adjacent the outlet opening, a cross bar extending across the upper portion of the receptacle, a valve stem extending through the cross bar and through the outlet opening, a disk valve slidably mounted upon the pins, the lower portion of the stem being threaded and screwed through a threaded opening formed in the disk valve, a gasket beneath the disk valve having an opening through which the threaded portion of the stem passes, and resilient means yieldably retaining the stem in a lowered position.

3. A pancake machine comprising a receptacle having a bottom provided with an outlet opening, guide pins extending from the bottom adjacent the opening, a cross bar positioned above the outlet opening, a valve stem extending through the cross bar and having a threaded lower end portion extending through the outlet opening, a valve disk slidably mounted upon the guiding pins and having a threaded opening receiving the lower portion of the stem, and a gasket positioned beneath the disk.

In testimony whereof we affix our signatures in presence of two witnesses.

JOHN BALENTI.
MICHAEL R. BALENTI.

Witnesses:
  A. H. MEYER,
  I. E. WHARTON.